June 16, 1931.  E. W. ENGLE  1,810,395
METHOD OF USING ELECTROLYTIC RECTIFIERS IN SERIES
Filed Jan. 7, 1927
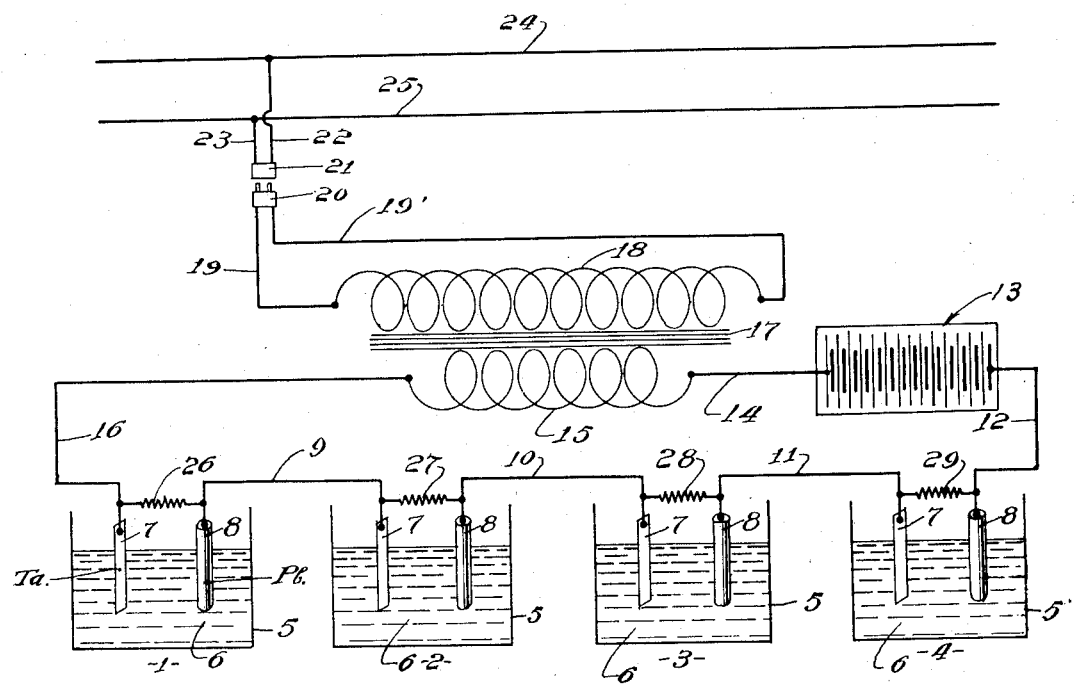
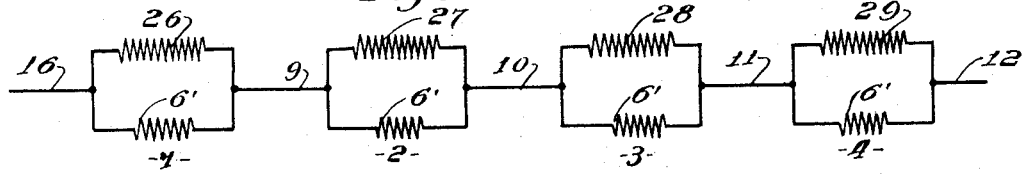
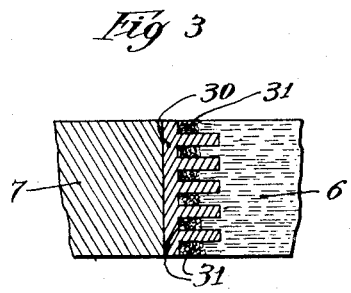
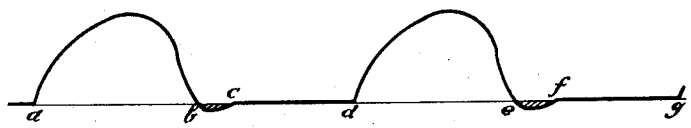
Inventor:
Edgar W. Engle
By: Williams, Bradbury,
McCaleb & Hinkle
Atty's Patented June 16, 1931

1,810,395

UNITED STATES PATENT OFFICE

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK

METHOD OF USING ELECTROLYTIC RECTIFIERS IN SERIES

Application filed January 7, 1927. Serial No. 159,522.

My invention relates to rectifying alternating current by the use of electrolytic cells and it pertains specifically to the rectification of currents at voltages above the limits of one cell.

Heretofore when a plurality of electrolytic cells has been operated in series for charging batteries at voltages higher than the limits of one electrolytic cell, the rectifiers have become unbalanced, one or more cells being extremely active while others remain substantially inert. This results in the rapid deterioration of certain cells due to oxidation or hydrogen-absorption or both, as will be hereinafter explained.

I have discovered that the rectifier cells may be kept uniform in their action by bridging the electrodes of each cell with a high resistance of such magnitude that the actual current flowing during the half of the current cycle which is ordinarily cut off by the rectifier action is so small as to be negligible in comparison with the current flowing in opposite direction during the other half of the cycle.

The object of this invention is, therefore, to provide a simple inexpensive means for balancing the load among cells connected in series for rectifying current at voltages above the limits of one cell. Other objects will be apparent as the detailed description of the invention proceeds.

The preferred embodiment of the invention is illustrated in the accompanying drawings in which:

Fig. 1 is a diagrammatic arrangement of four electrolytic cells connected in series and charging a series of storage battery cells;

Fig. 2 is a diagrammatic sketch showing the relation of the resistances to the internal resistance of the cells;

Fig. 3 is a highly exaggerated sketch illustrating the film formation on the tantalum electrode;

Fig. 4 is a current diagram showing the rectification produced by the usual tantalum rectifier.

In the following description similar reference characters will designate similar elements throughout the drawings.

A number of cells, 1, 2, 3 and 4, comprising acid-proof containers, 5, filled with a suitable electrolyte, 6, are arranged in series. The electrolyte is preferably dilute sulphuric acid to which a small amount of ferrous sulphate or other beneficial material has been added.

Immersed in the electrolyte are two electrodes, a film forming electrode 7, preferably of tantalum, and a non-film forming electrode 8, preferably of lead. The lead electrode of cell 1 is connected by wire 9 to the tantalum electrode of cell 2. Lead electrode 8 of cell 2 is connected to the tantalum electrode of cell 3 by wire 10, and the lead electrode of cell 3 is connected to the tantalum electrode of cell 4 by wire 11. The lead electrode of cell 4 is connected by a wire 12 to a series of storage battery cells 13, fourteen cells being used in the preferred embodiment described. The positive terminal of the storage battery group is connected to the secondary coil 15, the other end of which is connected by wire 16 to the tantalum electrode of rectifier 1. Coil 15 is wound around transformer core 17 on which is also wound primary coil 18 connected by wires 19 and 19' to a conventional plug 20 adapted to be inserted in a conventional socket, 21, which is connected by leads, 22 and 23, to an ordinary lighting power circuit, 24 and 25.

In the arrangement shown the transformer converts alternating current at 115 volts to about 65 volts, which enables the fourteen battery cells to be charged at the rate of about ¾ ampere.

While the load is imposed on the rectifiers connected in this manner it is found that the voltage drop across each cell is not constant. The film on one of the tantalum electrodes is broken down which apparently causes that electrode to decompose, due to hydrogen absorption, and which apparently places a heavier load on the remaining cells—which in turn causes them to become oxidized due to the excessive voltage to which they are subjected. A high resistance, preferably 3500 ohms, is inserted between the electrodes 7 and 8 of each cell at 26, 27, 28 and 29 respectively.

The action of the high resistance has not been definitely ascertained but its function is believed to be set forth by the following explanation:

The modern conception of valve action is to the effect that an oxide film is formed on the tantalum electrode when this electrode is serving as anode. At the same time oxygen is liberated and a certain amount of this oxygen gas is held in the pores of the oxide film forming high resistance gas film or skin which effectively permits the electrons to pass from the metal 7 and prevents the ions in the electrolyte from coming in contact with the metal to deliver up their charge. This oxide film also prevents the absorption of hydrogen by the tantalum electrode when said electrode is serving as cathode. This function of the oxide film is very important as the tantalum electrode will soon become brittle and will decompose unless protected by such an oxide film.

In Fig. 3 the tantalum electrode 7 is shown as being coated with an oxide film 30 in the pores of which is a gas film 31 of oxygen—forming a barrier between the metal electrode, 7, and the electrolyte, 6.

It is found that when the tantalum is cathode the current easily flows from the electrolyte to the tantalum and at the same time the oxide film tends to decrease in thickness. This is represented by the period from "$a$" to "$b$" in Fig. 4. At "$b$" when the valve closes it is found that a small amount of current, represented by the shaded area "$bc$", flows in the opposite direction which under normal operating conditions serves to keep the film at proper thickness.

Should the film in any cell become impaired for any reason, it is found that the remaining cells of the series effectively prevent the current, represented by "$bc$", from reaching a value sufficient to reform the broken or impaired film.

I remedy this situation by providing a series of by-passes around the remaining cells so that the current in the reverse direction will be sufficient to mend this film. As a specific example, let us consider a current flowing clockwise in the secondary circuit of Fig. 1. The resistances 6' between the electrolyte and tantalum are very low and practically the entire current passes unimpeded through the series. When the current reverses and flows counter-clockwise in this circuit the resistances 6' become so great that no appreciable current can pass.

If the gas film on the tantalum electrode of cell #3 is impaired and there were no high resistances, 26 to 29, cells 1, 2 and 4 would prevent the reversed current from building up film in cell 3.

When the high resistances are in the circuit as shown, current may pass around cells 1, 2 and 4 by means of resistances 26, 27 and 29, thus permitting sufficient current to flow in this direction to build up the film in cell 3 and enable it to carry its part of the load.

While I have specifically described the preferred embodiment of my invention, I do not limit myself to the details shown and I intend that the scope of my invention shall be determined by the following claims:

1. An electrolytic rectifier comprising a number of electrolytic cells in series, each cell having a filmed tantalum electrode and being provided with a high resistance connection across its terminals providing a shunt path for current flowing in a direction opposite to the normal flow through said cells to reform the film on the tantalum electrodes.

2. An electrolytic rectifier comprising a number of tantalum-lead-sulphuric acid cells connected in series and provided with a high resistance connector between the tantalum and lead electrodes of each cell.

3. The rectifier of claim 2 wherein the high resistance is about 3500 ohms.

4. The method of reforming the film on the cathode of one of a series of electrolytic rectifier cells which comprises shunting a film forming current across the terminals of the remaining cells of the series.

5. The method of preventing hydrogen absorption by the filmed electrode of one of a series of electrolytic rectifiers which comprises shunting a film forming current across the terminals of the remaining cells, whereby the film is built up during the period when normally no current would flow.

6. A method of maintaining the film on the tantalum electrodes of series connected, electrolytic rectifier cells which comprises shunting a portion of the negative current component by each cell during the normal operation of the cells, and utilizing this shunted current component where required to reform the film on the tantalum electrodes.

In witness whereof, I hereunto subscribe my name this 5th day of January, 1927.

EDGAR W. ENGLE.